(No Model.)
J. D. MORRISON.
CHECKREIN HOOK.
No. 557,856. Patented Apr. 7, 1896.
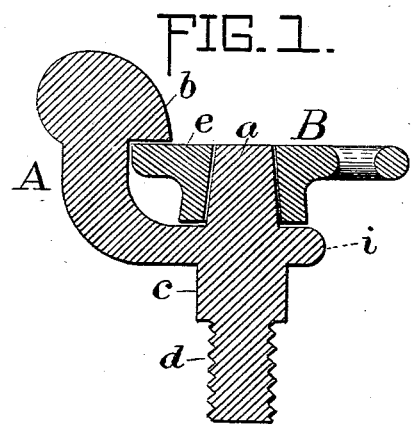
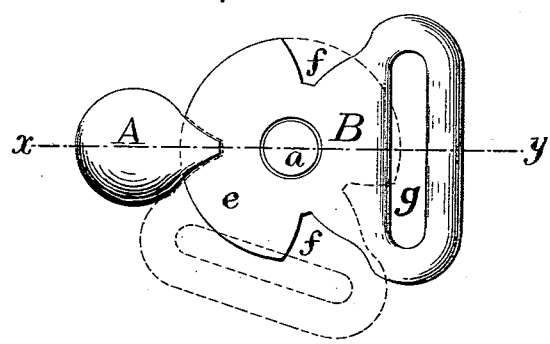
Witnesses:
W. Ellwood Allen.
Walter Allen
Inventor.
James D. Morrison.
By Knight Bros. Attys.

UNITED STATES PATENT OFFICE.

JAMES D. MORRISON, OF REINBECK, IOWA, ASSIGNOR OF TWO-THIRDS TO J. W. COOK, OF GRUNDY, IOWA, AND R. J. GOERNER, OF ST. LOUIS, MISSOURI.

CHECKREIN-HOOK.

SPECIFICATION forming part of Letters Patent No. 557,856, dated April 7, 1896.

Application filed September 19, 1895. Serial No. 562,989. (No model.)

*To all whom it may concern:*

Be it known that I, JAMES D. MORRISON, a citizen of the United States, and a resident of the town of Reinbeck, in the county of Grundy and State of Iowa, have invented certain new and useful Improvements in Checkrein-Hooks; and I do hereby declare that the following is a full, clear, and exact description of the same.

The object of my improvement is to provide means whereby the checkrein of a bridle may be connected with the back-band of a harness in such a manner as to prevent a horse from "unchecking" himself and at the same time allow him to be readily unchecked by his driver.

My invention is illustrated in the accompanying drawings, in which—

Figure 1 is a central vertical section showing my checkrein-hook with my rein-holder attached, the section being on the line $x\,y$, as shown in Fig. 2. Fig. 2 is a view from above showing my rein-holder attached to my checkrein-hook when in normal position, with dotted lines showing position of my rein-holder when the same is to be detached from the checkrein-hook. Fig. 3 shows the nut with which the checkrein-hook is secured to the harness-tree.

A denotes my improved checkrein-hook, which comprises the vertical journal $a$, the square shoulder $c$, the threaded stem $d$, and the body $i$, provided at the inner side of its rear end with the horizontal lip or projection $b$.

B denotes my improved rein-holder, and comprises a disk $e$, provided with a vertical central opening corresponding to and accommodating the journal $a$, Fig. 1, a loop $g$ to receive the bridle-rein, and the notches $f\,f$ on opposite sides of the disk and immediately behind the loop $g$.

This device is operated as follows: The checkrein-hook A is attached to the harness-tree by means of the nut $h$, and the rein-holder B is connected therewith by passing the central opening therein and one of the notches down over the vertical journal $a$ and the projection $b$, respectively, as shown by dotted lines in Fig. 2, and turning one-fourth around to its normal position on line $x\,y$ in Fig. 2. The rein-holder B is released by reversing the above operation.

I consider the gist of my improvement to lie, generically regarded, in a checkrein-hook with a vertical journal and a detachable rein-holder with a corresponding vertical opening or bearing, and notches on its opposite sides, the rein-holder being held in its normal position on said journal by a projection on and forming a part of the checkrein-hook and being released from such position by turning one of its notches to correspond with the projection on the checkrein-hook, and I do not therefore wish to be understood as limiting my invention to the specific details of the construction herein shown and described.

What I claim as new, and desire to secure by Letters Patent, is—

1. A detachable checkrein-hook comprising a body formed with a horizontal lip at the inner side of its rear end, with a vertical journal located above the body, with an angular shoulder beneath the body and with a threaded stem; substantially as described.

2. A detachable checkrein-holder comprising a body formed with a horizontal lip at the inner side of its rear end, and with a vertical journal located above the body and a rein-holder formed with a single disk, with a vertical central journal-opening, with a loop, and with notches adjacent to the loop through which the lip is adapted to pass; substantially as described.

3. A checkrein-hook comprising a body formed with a horizontal lip at the inner side of its rear end, with a vertical journal located above the body, with a stem located beneath the body and the detachable rein-holder formed with a disk, with a vertical central journal-opening, with a loop, and with notches adjacent to the loop through which the lip is adapted to pass; substantially as described.

In testimony whereof I affix my signature in presence of two witnesses.

JAMES D. MORRISON.

Witnesses:
ALBERT JAQUA,
J. W. COOK.